Dec. 22, 1942. W. G. BROWN ET AL 2,305,840
SPRAY GUN STRUCTURE AND VALVE APPLICABLE FOR USE THEREWITH
Filed Sept. 5, 1940 2 Sheets-Sheet 1
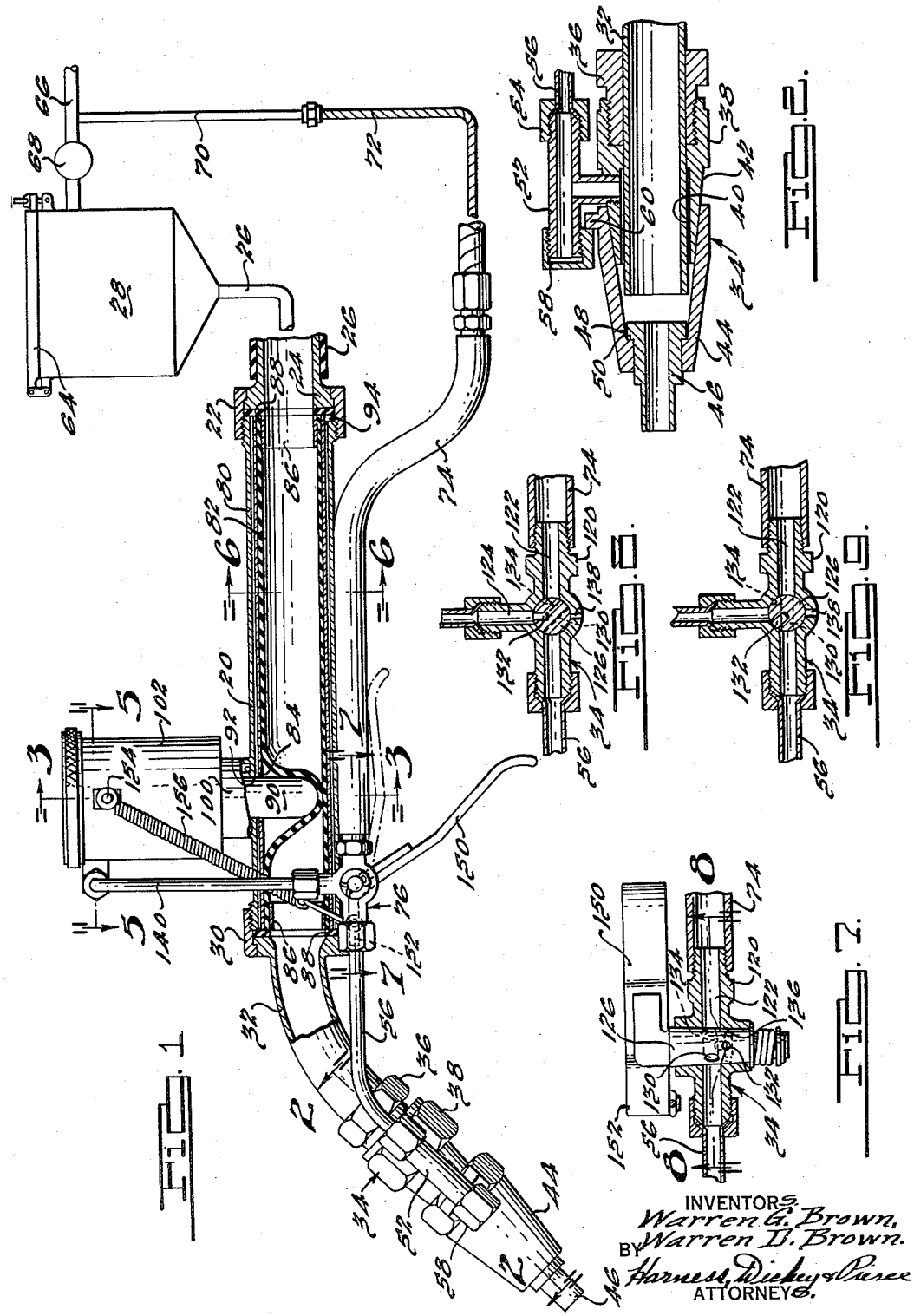
INVENTORS
Warren G. Brown,
BY Warren D. Brown.
Harness, Dickey & Pierce
ATTORNEYS.

Dec. 22, 1942.  W. G. BROWN ET AL  2,305,840
SPRAY GUN STRUCTURE AND VALVE APPLICABLE FOR USE THEREWITH
Filed Sept. 5, 1940  2 Sheets-Sheet 2
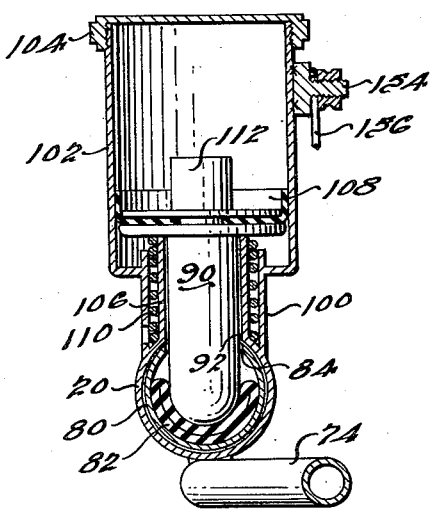
FIG. 3.
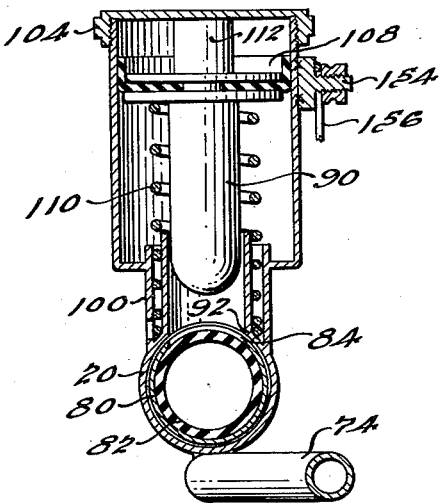
FIG. 4.
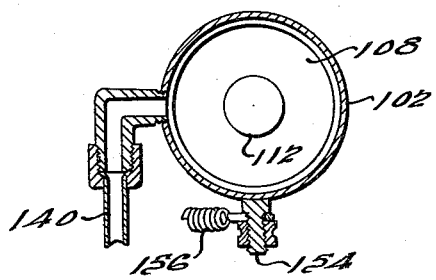
FIG. 5.
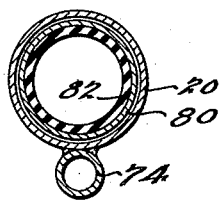
FIG. 6.
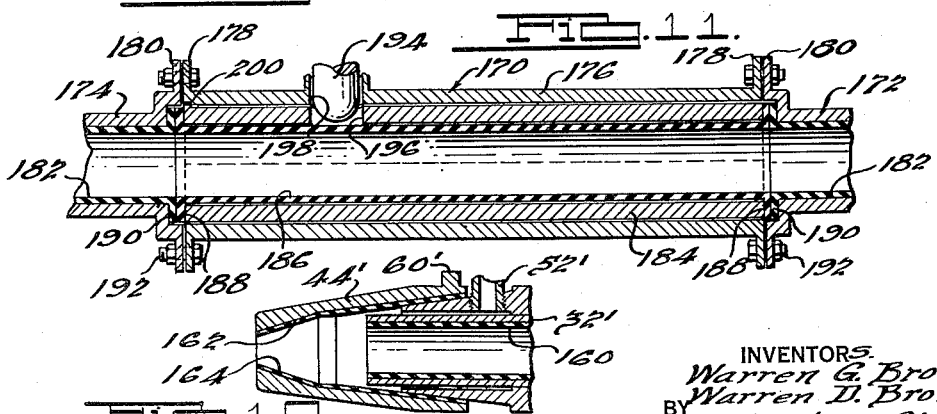
FIG. 11.
FIG. 10.
INVENTORS.
Warren G. Brown,
Warren D. Brown.
BY Harness, Dickey & Pierce.
ATTORNEYS.

Patented Dec. 22, 1942

2,305,840

UNITED STATES PATENT OFFICE 2,305,840

SPRAY GUN STRUCTURE AND VALVE APPLICABLE FOR USE THEREWITH

Warren G. Brown and Warren D. Brown, Detroit, Mich., assignors of forty per cent to Francis C. Bagby, Birmingham, Mich.

Application September 5, 1940, Serial No. 355,450

5 Claims. (Cl. 91—45)

This invention relates to valves and to valves in conjunction with spray guns or the like, the principal object being the provision of a new and novel valve structure, as well as to the combination of such valve with a spray gun or the like.

Objects of the invention include the provision of a valve structure including a deformable sleeve together with novel means associated therewith operable to effect such deformation thereof as to prevent the flow of material through the sleeve; the provision of a valve structure including a deformable sleeve exteriorly reinforced against expansion beyond a desired diameter together with means projectable through the reinforcing means for effecting deformation of the sleeve to prevent the passage of material therethrough; the provision of a valve structure including a generally cylindrical sleeve formed from rubber or rubber-like material and peripherally enclosed in a non-deformable casing, the casing being provided with an opening therein, and an associated plunger being movable through the opening to deform the sleeve to prevent the passage of material therethrough; the provision of a construction as above described in which the plunger acts to fold a portion of one side of the sleeve against the opposite side of the sleeve without materially distorting the normal shape of said latter side; the provision of a valve structure of the type above described in which the plunger is provided with a partly circular end the radius of which is equal to the radius of the outside surface of the deformable sleeve less approximately twice the thickness of the sleeve; the provision of a valve structure as above described in which means are provided for limiting the inward movement of the plunger in valve closed position; and the provision of a valve structure including a rubber or like deformable sleeve each end of which is provided with an annular outwardly directed flange, a rigid split sleeve surrounding the deformable sleeve between the flanges of the latter whereby the inner deformable sleeve may be readily replaced by separating parts of the rigid sleeve, together with a plunger movable transversely through a wall of the split sleeve and operable against the outer surface of the deformable sleeve to effect a folding of a part of the wall thereof to close the deformable sleeve to the passage of material therethrough.

Other objects of the invention include the provision of a spray gun including a material passage formed by a deformable sleeve, together with means for deforming the sleeve to such an extent as to prevent the flow of material therethrough when it is desired to discontinue operation of the spray gun; the provision of a spray gun of the type described in which air under pressure is provided for atomizing or otherwise dividing the flow of material being ejected from the gun and including means actuated by such air under pressure to control the position of the sleeve deforming means; and the provision of a spray gun so constructed and arranged as to particularly adapt it to the spraying of cementitious material and particularly such material as include as an element thereof sand or like granular material.

Further objects of the invention include the provision of a spray gun or the like including a device having a material passage and an air passage, the material passage including valvular means for controlling the flow of the material therethrough and air actuated means for controlling the operation of the valvular means, control valve means being provided so constructed and arranged that when moved to discontinue the flow of air to the discharge nozzle of the device, air under pressure will automatically be introduced to the valve actuating means whereby to effect closure of the valve, and movement of the control valve means to effect discharge of air from the nozzle of the device will automatically act to relieve the valve actuating means of air pressure whereby to effect an opening of the material passage valve.

The above being among the objects of the present invention the same consists in certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views:

Fig. 1 is a partially broken, partially sectioned side elevational view of a spray gun embodying the present invention and illustrating associated parts in more or less diagrammatic form;

Fig. 2 is an enlarged fragmentary sectional view taken on the line 2—2 of Fig. 1 and illustrating the construction of the nozzle for the gun;

Fig. 3 (Sheet 2) is an enlarged vertical sectional view taken on the line 3—3 of Fig. 1 and illustrating the construction of the valve plunger and its operating mechanism, showing the plunger in valve closed position;

Fig. 4 is a view similar to Fig. 3 but illustrating the valve plunger in valve opened position;

Fig. 5 is a transverse sectional view of the plunger controlled cylinder, taken on the line 5—5 of Fig. 1;

Fig. 6 is a transverse sectional view taken on the line 6—6 of Fig. 1;

Fig. 7 is a fragmentary sectional view taken on the line 7—7 of Fig. 1 and illustrating the construction of the control valve;

Fig. 8 is a fragmentary sectional view taken centrally of the control valve as on the line 8—8 of Fig. 7 and illustrating the valve in the position it assumes when the control valve for the material passage is in closed position;

Fig. 9 is a view similar to Fig. 8 but illustrating the position of the control valve when the valve for controlling the material passage is in open position;

Fig. 10 is a fragmentary sectional view taken axially through a modified form of nozzle for the spray gun shown in Fig. 1 particularly useful where the latter is employed for sand or other blasting purposes; and, Fig. 11 is a fragmentary sectional view taken axially through a rubber lined pipe line incorporating a valve constructed in accordance with the present invention.

The present invention deals primarily with a valve structure particularly applicable for use for controlling the flow of material embodying at least in part grains or other particles of hard substances of such character as would prevent the use of ordinary types of valves or would quickly render ordinary types of valves inoperative because of wear, abrasion, or the like; as well as fluids of a corrosive nature, either of acid or alkaline character, the corrosive nature of which would adversely affect the structure of ordinary types of valves. While thus capable of relatively wide usage, because of its ability to control the flow of material carrying particles of abrasive or of abrasive-like character, it is particularly adaptable for use in connection with so-called spray guns employed for coating walls or other surfaces with a layer of concrete or other cementitious compounds or materials, particularly so because of the fact that the supply of air under pressure employed in such devices for atomizing or otherwise breaking up the solid flow of material from the device offers a ready and convenient means for providing an automatic control of the valve and, accordingly, in a more limited sense the present invention also deals with a so-called "spray gun" of the type described, and the application of such valve to such spray gun is employed herein not only to primarily illustrate the construction and operation of the valve itself, but to also disclose the invention in its more limited sense.

Referring now to the accompanying drawings and particularly to Fig. 1 the spray gun there illustrated is shown as being provided with a tubular, cylindrical, rigid metal body member 20 the opposite ends of which are exteriorly threaded. At its rear end the body 20 is connected by means of a nut 22 to a connecting member 24 suitably fixed to the end of a flexible hose or tube 26 which extends to and is connected into the bottom of a material container 28 which will hereafter be described in greater detail.

The forward end of the body 20 is connected by a nut 30, similar to the nut 22, to a short tube 32 which in most, but not all, cases will be of a curved conformation as shown. The outer end of the tube 32 carries a nozzle structure indicated generally at 34 and the details of which are more clearly brought out in Fig. 2.

Referring to Fig. 2 it will be noted that the tube 32 has fixed and sealed thereto as by welding, brazing, soldering or the like an externally threaded nut member 36 located at a material distance inwardly from the discharge end of the tube 32. A second nut member 38 surrounding the tube 32 is threadably received upon the nut member 36 and the outer or lefthand portion of the bore of the nut member 38, as viewed in Fig. 2, is bored out to a size greater than that immediately adjacent the nut 36 so as to provide an annular air passage 40 between it and the exterior surface of the tube 32. It will also be noted that the outer end portion of the nut member 38 is tapered in a radially inwardly and axially outwardly direction so that its outer exterior surface provides a frusto-conical surface 42. A nozzle assembly proper including members 44 and 46 are supported upon the tapered surface 42 of the nut member 38, the member 44 being hollow and being provided with a frusto-conical bore complementary in part to the frusto-conical surface 42 upon which it is more or less wedgingly received. The part 46 is of tubular construction and has a main body portion of a diameter to be relatively closely but slidably received within the bore at the outer end of the part 44, so as to be readily removable therefrom, and is also provided with an inner peripheral flange 48 which seats against the internal seat or shoulder 50 of the member 44 to limit its movement axially outwardly of the member 44. The outwardly projecting end of the part 46 is preferably of relatively thin walled section permitting it to be deformed to any desired cross-sectional configuration, although shown round for the purpose of illustration.

In order to enable air to be introduced into the annular passage 40, as well as to provide a means for locking the nozzle proper 44—46 on the nut member 38, a T 52 is provided, the leg thereof being threaded through the wall of the nut member 38 rearwardly of the rear end of the part 44 and with the interior thereof in open communication with the passage 40. One side of the head of the T is connected by a nut 54 with an air tube 56. The opposite side of the head of the T is closed by a cap member 58. The part 44, adjacent its rear end, is provided on its periphery with a radially outstanding projection 60, preferably arranged in more or less screwlike relation upon the surface of the part 44 and arranged to engage the axially inner edge of the cap 50. The cam-like relation of the projection 60 in its engagement with the cap 58 permits the part 44 to be securely drawn up on the tapered surface 42 of the nut member 38 by engaging the projection 60 back of the cap 58 and turning the part 44 in a direction to cam the part 44 to the right as viewed in Fig. 2.

Where the gun is to be employed for the purpose of applying a coat of cement-like material or cement composition to a wall or the like, suitable amounts of cement, which ordinarily will be of Portland cement, sand, water, and such other ingredients as may be deemed necessary or desirable are suitably mixed together and placed in the tank 28 in which, if desired, additional and conventional means may be provided for maintaining the same against settling and in an evenly distributed or uniformly consistent state. The tank 28 is provided with a removable cover 64 which may be readily secured in place in air-tight relation in a conventional manner. A source of air under pressure is connected to the tank through a pipe 66 having a reducing valve 68 therein. A branch 70 of the pipe 66 connected thereto in advance of the reducing valve 68 and including a flexible section 72 is connected to a tube 74 secured to the underside of the body 20 and is connected through a control valve indicated generally at 76 with the air tube 56.

It will be appreciated that with this construction the air fed to the tank 28 is at a slightly lower pressure than the air fed to the annular passage 40 in the nozzle 34, this feature being conventionally preferable as is well understood in the art. During operation the air pressure in the tank 28 forces the material therefrom through the flexible tube or pipe 26 and through the gun where it is discharged from the end of the tube 32 and is mixed with the air within the part 44 of the nozzle and the resulting mixture is discharged through the nozzle member 46 in a more or less finely divided state depending upon the relative amount of air used in proportion to the material and the pressure at which the air is introduced, as well as the character of the material itself.

It will be appreciated that the operation of the gun will usually be periodically interrupted, sometimes at relatively short intervals, during the application of the material discharged therefrom to a wall or other surface and this particularly where a workman is applying a cement-like mixture to a wall in such position as to require constant shifting of the position of the workman with respect to the wall. Under such conditions it is, of course, not feasible to shut off the supply of air to the tank 28 and the pipe line 66 each time operation of the gun is interrupted and for this reason some means must be provided for interrupting not only the flow of material through the main body portion 20 but also the supply of air through the tubes 74 and 56. The means for interrupting the flow of material through the main body portion 20 constitutes the gist of the present invention and is accomplished as follows.

Removably received within the body 20 in telescopic relation with respect thereto is a cylindrical metal sleeve 80, preferably of relatively thin wall section. This sleeve 80 is provided with a liner 82 of suitable imperforate deformable material but preferably of rubber or a rubber-like composition. The sleeve 80 is provided with an opening 84 of circular conformation therein and the liner 82 may be vulcanized to the sleeve 80 at all points except for an area extending a short but material distance around the margins of the opening 84. On the other hand, such vulcanization may be dispensed with and the liner 82 made up as a sleeve or tube of the same length as the sleeve 80 and of such diameter as to be closely received therein and secured within the sleeve 80 at opposite ends by means of a metal ferrule 86 of such diameter as to frictionally clamp the ends of the liner 82 securely within the ends of the sleeve 80 and this is the construction illustrated in Fig. 1. In order to seal the end of the tube 80 and liner 82 against leakage with respect to the connection 24 and tube 32, respectively, the cooperating ends of the connection 24 and tube 32 are provided with a radial face against each of which a rubber or like washer 88 is positioned so that when the nuts 22 and 30 are drawn up washers 88 are not only compressed between the corresponding ends of the body 20 and the connection 24 and tube 32, respectively, but are also compressed between the ends of the sleeve 80 and liner 82 and these same parts.

The sleeve 82 is the primary element of the material valve structure and to render it effective as a valve, a plunger 90 is mounted upon the body 20 for movement in a radial direction through the opening 84. The body 20 for this purpose is provided with an opening 92 through which the plunger 90 is projectable. The openings 84 and 92 are maintained for alignment angularly about the axis of the body 20 by means of a lug 94 fixed to the rear end of the sleeve 80 and received in a cooperating locating notch or groove in the rear end surface of the body 20 as shown in Fig. 1. When the plunger 90 is withdrawn from the interior of the sleeve 80 and its liner 82 through the opening 84 and pressure is applied to the material within the tank 28, line 26, and consequently to the interior of the liner 80, such pressure will cause the liner 82 to closely conform to the interior surface of the sleeve 80, and where the plunger 90 is withdrawn sufficiently may even cause a portion of the liner 82 to bulge upwardly into the opening 84, and while this latter feature is not particularly desirable it is not particularly disadvantageous providing such bulging is not permitted to such an extent as to endanger rupturing of the liner 82 under the pressures to which the material is subjected.

The lower or operative end of the plunger 90, as viewed in Fig. 1, is formed to a semi-spherical shape and has a diameter substantially equal to the external diameter of the sleeve 80 less twice the thickness of the liner 82, although it may be slightly greater in diameter under some conditions. With this arrangement, and as best illustrated in Fig. 3, when the plunger 90 is moved downwardly its end causes the upper surface of the liner 82 at the point where it contacts the same to bend around the operative end of the plunger 90 and causes the liner 82 to fold upon itself into the more or less semi-ring-like conformation shown in Fig. 3, the lower half of the liner 82 at the point where the plunger 90 engages it retaining its original shape as controlled by the sleeve 80. As will be appreciated from an inspection of Fig. 3 this folding of that portion of the liner 82 in line with and adjacent the plunger 90 effectively closes the liner 82 to the flow of material therethrough. Where the downward projection of the plunger 90 is limited to a distance which will simply bring the opposite walls of the liner 82 into contact with each other, as illustrated in Figs. 1 and 3, no weakening effects on the liner because of the action of the plunger thereon will occur. However, it may be desirable that the plunger be of such size and it may be projected downwardly to such an extent that a slight compression of the material in the liner occurs when the plunger is moved to fully closed position.

One advantage of the valve thus formed will be readily appreciated in that because of the character of the liner 82 any small particles of solid matter, such as sand, that may be contained in the material flowing through the liner and that happens to be caught between the two opposite walls of the liner 82 at the time the same are collapsed by the plunger 90, because of the character of the liner 82 will simply become imbedded in the material of the liner. Thus such particles will not prevent complete closing of the valve structure unless they are of unwarranted size, and the material of the liner 82 will simply yield and permit the imbedding of such material in it without having any deleterious effects on the material of the sleeve 80.

Should the liner 82 become ruptured for any reason whatever, or become worn through continued use or from abrasions of the material passing therethrough, it may be readily replaced by unscrewing the nuts 22 and 30, removing the sleeve 80 and the liner 82 contained therein, and then by removing the ferrules 86 the liner 82 may be removed from the sleeve 80 and a new liner inserted in its place, whereupon the various parts may be re-assembled in the reverse order from that described.

The use of the valve structure described in a spray gun of the type described employed a supply of air under pressure renders it possible to operate the plunger 90 in a novel manner which constitutes a further part of the present invention. For this purpose a sleeve 100 is welded, brazed or otherwise secured to the body 20 in surrounding relationship with respect to the opening 92 and in outwardly spaced relationship with respect to the margins of such opening and with its axis radially disposed with respect to the axis of the body 20. This sleeve 100 projects through and is sealed and secured to the lower wall of a co-axial air cylinder 102 the opposite end of which is open and is normally closed by a cap or cover 104. A second sleeve 106 is positioned concentrically within the sleeve 100 and in inwardly spaced relation thereto and its lower end, as viewed in the drawing, is suitably secured and sealed to the main body portion 20 immediately around the opening 92 and is of such diameter as to relatively closely but slidably receive the plunger 90 therein.

The plunger 90 projects upwardly to within the cylinder 102 and has secured thereto within the cylinder a suitable piston 108. A coil spring 110 surrounding the sleeve 106 and partly located in the annular space between the sleeves 100 and 106 is maintained under compression between the piston 108 and the main body 20 and constantly urges the piston 108 and plunger 90 upwardly as viewed in the drawings, or in other words towards the valve opened position illustrated in Fig. 4. The plunger 90 is provided with an upward extension 112 extending above the piston 108 and contact of this extension with the cover or cap 104 serves to limit upward movement of the piston and plunger in the cylinder 102 under the influence of the spring 110.

It will be appreciated that if air under pressure is introduced to the cylinder 102 above the piston 108 the pressure of such air acting against the piston 108 will overcome the force of the spring 110 and force the piston 108 and plunger 90 downwardly to a position in which the walls of the liner 82 will be collapsed, as indicated in Fig. 3, and thus place the valve in closed position. In order to prevent the downward movement of the plunger 90 to a point below that desired, as previously explained, the inner sleeve 106 is extended upwardly a sufficient amount to engage the piston 108 and form a stop for the same when the plunger 90 has reached its desired position in a closing direction, as particularly brought out in Fig. 3.

The air for operating the piston 108 and plunger 90 is obtained from the control valve 76 previously mentioned and which valve controls the flow of air under pressure from the source of supply to the nozzle 34. Referring now to Figs. 7, 8 and 9 in particular it will be noted that the valve 34 in general is of a conventional tapered three way plug type having a main body portion 120 provided with one passage 122 extending therethrough in a straight line and a branch passage 124 extending perpendicularly thereto, the valve plug 126 being located in a conventional manner at the intersection of the passages 122 and 124.

The plug 126 has one hole 130 extending diametrically therethrough and of relatively large size so that when the plug 126 is turned to align the hole 130 with the passage 122 a relatively large volume of air may flow directly from the tube 74 through the valve 76 and into the tube 56 to the nozzle 34. A smaller branch opening 132 is provided in the plug 126 and extends at an angle of approximately 45°, as indicated in Figs. 8 and 9, with respect to the axis of the opening 130 and connects the opening 130 with the surface of the plug 126 on one side thereof only. As indicated in Fig. 9 when the plug 126 is turned to bring the opening 130 into alignment with the passage 122, the passage 132 is closed to the passage 124. When the plug 126 is turned in a clockwise direction from the position thus described and illustrated in Fig. 9 to a position to block the lefthand end of the passage 122 to the flow of air therethrough, the passage 132 is brought into alignment with the passage 124. In order to permit air from the tube 74 to flow through the righthand end of the passage 122 and thence through the passage 132 to the passage 124, the surface of the plug 126 at the righthand end of the passage 130, as viewed in the drawings, is slightly cut-away as indicated at 134 so that air may then flow from the tube 74 through the righthand end of the passage 122, through the notch or cut-away portion 134 into the passage 130 and thence through the passage 132 into the passage 124.

It will also be noted that a diametrical passage 136 of smaller dimension than the passage 130 and offset from the passage 130 axially of the plug 126 is also provided in the plug 126 and is so positioned that when the plug 126 is in the position indicated in Fig. 9, one end of it is aligned with the passage 124. In such position the opposite end of the passageway 136 is aligned with a relief opening 138 in the body 120 and leading to the atmosphere. The passageway 124 is connected by a tube 140 to the upper end of the cylinder 102 at a point therein above the upper edge of the piston 108 when the piston is in its extreme outer position of movement under the influence of the spring 110 and as illustrated in Fig. 4.

With the construction thus described it will be appreciated that when the tube 74 contains air under pressure and the valve plug 126 is turned to the position indicated in Fig. 9, such air flows directly through the valve 76 to the tube 56 and thence through the nozzle 34, no air under pressure being admitted to the passageway 124 and consequently to the cylinder 102, but on the contrary the interior of the cylinder 102 being in open communication with the atmosphere through the tube 140, passage 124 of the valve body 20, passage 136 in the plug 126, and passage 138 in the body 120, thus relieving the interior of the cylinder 102 of pressure and permitting the spring 110 to move the plunger 90 and piston 108 to their extreme inoperative position. If now the valve plug 126 is turned in a clockwise direction from the position indicated in Fig. 9 to the position indicated in Fig. 8, the flow of air from the tube 74 to the tube 56 is interrupted, the communication between the cylinder 102 and the atmosphere is interrupted, and the interior of the tube 74 is placed in communication with the passages 124 and consequently the interior of the cylinder 102, this air under pressure acting against the piston 108 to move it and the plunger 90 downwardly to the valve closed position indicated in Fig. 3.

It may be noted that the relative positions of the passages 130 and 132 are preferably such that air will begin to flow through the valve from tube 74 to the tube 56 before the opening 136 is brought into alignment with the opening 138 and consequently before the plunger 90 is enabled to be retracted by the spring 110 to permit flow of material through the liner 82 and conversely, when moving the control valve 76 towards valve closed position of the material valve the air under pressure from the tube 74 will be introduced into the passage 124 and consequently the cylinder 102 before the flow of air to the tube 56 has been discontinued. This feature has been found of advantage particularly where cement compositions are being sprayed or otherwise discharged by the gun in that it closes the valve before the flow of air through the nozzle has been discontinued and, therefore, aids in ejecting the work material from the tube 32 and nozzle 34 after the material valve has been closed, and thus prevents such material from settling in the tube 32 and nozzle 34 to such degree, between operations, as might tend to plug the gun and particularly the nozzle upon resumption of the spraying operation. It also insures a full flow of the air through the nozzle of the gun prior to the time that the work material is delivered to the nozzle and consequently prevents any possibility of the work material from obtaining access to the annular air passage 40 in the nozzle 34 with consequent possible blockage of the same.

In order to effect ready operation of the control valve, a finger-piece 150 is fixed to the valve plug 126 and preferably arranged below the gun as illustrated in Fig. 1 so as to be convenient to operation by the index finger of a workman grasping the body 20 of the gun in his hand. The finger-piece 150 is provided with a forward extension 152 between which and a suitable pin 154 on the cylinder 102 is stretched a coil spring 156 constantly urging the valve plug 126 to a position in which the air to the nozzle 134 is cut-off and such air is applied to the interior of the cylinder 102 to close the material valve of the device.

From the above it will be appreciated that as far as the material controlling valve is concerned, it is reinforced against rupture from internal forces by the surrounding sleeve 80 and for this reason is capable of handling materials under relatively high pressure. For instance, in practice the material within the tank 28 is usually placed under a pressure of from 40 to 100 pounds per square inch and under such conditions relatively long periods of severe usage has shown very little if any deterioration of the liner 82. At the same time because of the character of the valve thus provided, no restriction of the material passage in the valve occurs, leaving a fully open passage for the work material to flow through and presenting no corners, cracks, pockets, or the like, as in conventional valves, in which such material might become lodged and thereafter interfere with the proper operation of the valve. Accordingly, the valve has a relatively large capacity as compared to conventional valves of the same size. As an illustration it may be stated that where a cement-like mixture of Portland cement, sand, water and other suitable material is placed in a tank equivalent to the tank 28 and placed under a pressure of sixty pounds per square inch, a valve of the identical construction shown in the drawings and in which the liner 82 has an internal diameter of three-quarters of an inch has continually discharged material from the tank at the rate of 240 pounds per minute. Accordingly, it will be appreciated that the spray gun structure shown and described is highly efficient. At the same time it has been demonstrated through relatively long periods of usage during which time the material valve has been repeatedly opened and closed through operation of the control valve by manipulating the finger piece 150, no plugging of the valve occurs and it remains fully operative under the most adverse conditions of operation.

The spray gun structure shown may, of course, be employed for discharging liquid or other flowable substances not containing any particles of hard material such as the sand above described. On the other hand the gun shown and described may be employed as a sand blasting gun but in such circumstances certain modifications are preferable in the tube 32 and nozzle 34 and which modifications are illustrated best in Fig. 10 in which the same numerals refer to equivalent parts in the construction first described except that such numerals bear a prime mark. In this case the tube 32', corresponding to the tube 32 previously shown and described, is preferably made straight so as to avoid possible abrasion caused by the sand particles striking against the outer side of the curve. The tube 32' in this case is provided with a rubber or similar flexible non-metallic liner 160 to better enable the tube 32' to withstand the abrasive action of the sand particles. Also in this case the nozzle part 44' is preferably employed without a part equivalent to the part 46 previously described and in such case its bore is preferably inwardly coned adjacent its discharge end as indicated at 162 and the bore of the nozzle part 44' is also provided with a rubber or like liner indicated at 164, thus protecting all parts of the gun subject to contact with the sand flowing therethrough under relatively high pressure from the abrasive effects of the sand. It will, of course, be understood that where such gun is employed for sand blasting purposes the sand will be in a more or less dry state and will be mixed with air in being fed from the supply tank through the hose or flexible pipe 26 to the gun.

The material valve itself, that is the rubber lined sleeve and associated plunger may, of course, be employed as a valve for controlling the flow of any flowable material through a pipe line or the like. Because of the fact that the surface thereof which the material being controlled comes in contact with may be formed of rubber or rubber-like substances, it is particularly adaptable for use in pipe lines carrying corrosive liquids, either of an alkaline or of an acid character. As a matter of illustration in Fig. 11 a modification of this valve structure specifically adapted for this purpose is shown.

Referring to Fig. 11 this valve structure in fragmentary form is indicated generally at 170 and as being interposed between two pipe sections 172 and 174. The valve 170 includes a cylindrical body portion 176 having radially directed flanges 178 at opposite ends thereof by means of which the valve 170 may be secured to the flanges 180 on the cooperating ends of the pipe sections 172 and 174. The pipe sections 172 and 174 are shown as being provided with a liner 182 of rubber or the like as usually will be desirable in such cases. Within the body 176 is received a cylindrical sleeve or shell 184, corresponding to the sleeve or shell 80 in the first described construction, but in this case the sleeve 184 is diametrically split throughout its length into two parts. A rubber or equivalent liner 186 is telescopically received within the sleeve or shell 184 but in this case the opposite ends of the sleeve 186 are provided with a radially outwardly directed annular flange 188 which overlie the respectively opposite ends of the sleeve or shell 184. The liners 182 for the pipe sections 172 and 174 are likewise provided with a radially outwardly directed flange 190 at their ends arranged in mating relationship with the corresponding flanges 188 of the sleeve 186 and these cooperating pairs of flanges are adapted to be firmly clamped in fluid-tight relationship with respect to each other when the cooperating flanges 178 and 180 are drawn together by the bolts 192.

A plunger 194, equivalent to the plunger 90 in the first described construction, is provided in conjunction with the sleeve 186 to form the valve, and this plunger is projectable through a cooperating opening 196 formed in the sleeve 184 and matching opening 198 formed in the body 176. The plunger 194 may be controlled and operated manually or by any suitable power actuated means such as, for instance, the type first described or otherwise. Alignment of the openings 196 and 198 is maintained by means of a lug 200 formed on the exterior surface of one-half of the sleeve 184 at one end thereof and received in a cooperating notch or groove in the end surface of the body 176 as shown.

In the construction illustrated in Fig. 11 and above described it will be appreciated that whenever it becomes necessary or desirable to replace the sleeve 186, the valve structure may be removed from between the pipe sections 172 and 174 by simply removing the bolts 192. When the valve structure 170 is thus removed, the sleeve 184 and the liner 186 may simply be slid endwise out of the body 176, the two halves of the sleeve 184 separated, the liner 186 removed and replaced by a new one upon which the two halves of the sleeve 184 may be re-assembled and re-inserted into the body portion 176 and the valve structure may then be re-assembled between the pipe line sections 172 and 174.

It will also be appreciated that the pipe sections 172 and 174 could be constructed in accordance with the same general plan as the valve 170, eliminating the plunger and the holes for its passage through the outer body and one of the split halves of the inner member. In other words, the liners 182 could be removably confined between a split metal sleeve and the latter removably received within an outer pipe or tube.

Formal changes may be made in the specific embodiments of the invention described without departing from the spirit or substance of the broad invention, the scope of which is commensurate with the appended claims.

What is claimed is:

1. In a spray gun structure or the like, in combination, a flexible non-metallic sleeve forming a passage for the flow of material through said gun, rigid means surrounding said sleeve and confining it against undesirable expansion, a plunger movable radially of said sleeve through said rigid means and operable upon movement in one direction to cause a limited area of said sleeve to be folded upon an adjacent area thereof within said rigid means whereby to interrupt the flow of material therethrough, means for supplying material to one end of said sleeve, a nozzle structure connected to the opposite end of said sleeve for receiving material therefrom, means for introducing air under pressure into said nozzle member for breaking up material discharged therefrom, and air operated means connected with said air introducing means for controlling the position of said plunger.

2. In a spray gun or the like structure, in combination, a flexible non-metallic sleeve forming a material passage for said gun, means surrounding said sleeve reinforcing the same against undesirable radial expansion, a plunger movable through the last mentioned means in a direction radial of said sleeve operable upon said sleeve to cause a portion thereof to be folded within said means so as to close said sleeve to the flow of material therethrough, a nozzle structure connected to one end of said sleeve and adapted to receive a flow of material therefrom, an air line connected with said nozzle for the purpose of delivering air thereto, a valve in said air line, a piston connected to said plunger, a cylinder surrounding said piston, and a connection between said valve and said cylinder, said valve being so constructed and arranged that when in one position air from said air line passes to said nozzle structure to the exclusion of said cylinder and when in another position air from said air line passes to said cylinder to the exclusion of said nozzle.

3. In a spray gun or the like structure, a main body portion having a material passage therethrough, valve means associated with said main body portion controlling the flow of material therethrough comprising a confined flexible non-metallic sleeve and a plunger movable transversely thereof, a nozzle structure connected to said main body portion for receiving material from said main body portion, an air line connected to said nozzle structure for introducing air under pressure thereto, air operated means for effecting operation of said plunger in a valve closing direction, spring means for effecting operation of said plunger in the opposite direction, and a control valve in said air line operable to optionally connect said air line with said nozzle or with said air operated means.

4. In a spray gun or the like structure, a main body portion having a material passage therethrough, valve means associated with said main body portion controlling the flow of material therethrough, a nozzle structure connected to said main body portion for receiving material from said main body portion, an air line connected to said nozzle structure for introducing air under pressure thereto, air operated means for effecting operation of said valve means in one direction, spring means for effecting operation of said valve means in the opposite direction, and a control valve in said air line operable to optionally connect said air line with said nozzle or with said air operated means, said control valve including a main body and a movable element and cooperating passages therein, said passages being so constructed and arranged that when said movable element is in one limit of its moveable position air flows from said air line to said nozzle to the exclusion of said air operating means and said air operated means is connected to the atmosphere, and when in another limit of its movable position said air operated means is cut off from atmosphere and the flow of air to said nozzle is discontinued and air under pressure from said air line is directed to said air operated means, and during movement of said movable element from the first mentioned limit of its position towards the second mentioned limit of its position said air under pressure flows to said air operated means prior to discontinuing the flow thereof to said nozzle and when moved from the last mentioned limit of its position towards the first mentioned limit of its position the flow of air to said nozzle is begun before the flow of air to said air operated means is discontinued.

5. In a spray gun or the like structure, in combination, a flexible non-metallic sleeve forming a material passage for said gun, means surrounding said sleeve reinforcing the same against undesirable radial expansion, a plunger movable through the last mentioned means in a direction radial of said sleeve operable upon said sleeve to cause a portion thereof to be folded within said means so as to close said sleeve to the flow of material therethrough, a nozzle structure connected to one end of said sleeve and adapted to receive a flow of material therefrom, an air line connected with said nozzle for the purpose of delivering air thereto, a valve in said air line, means for operating said valve, and means operatively interconnecting said valve and plunger for correlated movements.

WARREN G. BROWN.
WARREN D. BROWN.